(12) United States Patent
Hollenbeck et al.

(10) Patent No.: US 7,726,424 B2
(45) Date of Patent: Jun. 1, 2010

(54) MOTOR VEHICLE INCLUDING CONNECTION FOR CONTROLLABLE EQUIPMENT AND METHOD OF MAKING A MOTOR VEHICLE

(75) Inventors: Bruce P. Hollenbeck, Orefield, PA (US); Michael P. Kline, Boyertown, PA (US); Chris Andrew Hillman, Allentown, PA (US)

(73) Assignee: Mack Trucks, Inc., Allentown, PA (US)

( * ) Notice: Subject to any disclaimer, the term of this patent is extended or adjusted under 35 U.S.C. 154(b) by 1142 days.

(21) Appl. No.: 10/907,285

(22) Filed: Mar. 28, 2005

(65) Prior Publication Data

US 2006/0214472 A1   Sep. 28, 2006

(51) Int. Cl.
*B60K 17/28* (2006.01)
(52) U.S. Cl. .................................. 180/53.4
(58) Field of Classification Search ............. 180/53.4, 180/53.5, 315, 89.13, 320–324, 326
See application file for complete search history.

(56) References Cited

U.S. PATENT DOCUMENTS

| | | | | | |
|---|---|---|---|---|---|
| 4,047,587 | A | * | 9/1977 | Anstey | 180/53.4 |
| 4,258,765 | A | * | 3/1981 | Suomi | 144/195.1 |
| 4,436,177 | A | | 3/1984 | Elliston | |
| 5,347,910 | A | * | 9/1994 | Avila et al. | 89/41.22 |
| 5,484,250 | A | * | 1/1996 | Gilmore et al. | 414/723 |
| 5,590,731 | A | * | 1/1997 | Jacobson | 180/53.4 |
| 5,829,337 | A | * | 11/1998 | Barden | 91/432 |
| 6,030,169 | A | * | 2/2000 | Rossow et al. | 414/680 |
| 6,223,841 | B1 | * | 5/2001 | Susag et al. | 180/53.4 |
| 6,405,815 | B1 | * | 6/2002 | Stoever et al. | 180/53.4 |
| 6,446,738 | B1 | | 9/2002 | Boyd | |
| 6,837,319 | B2 | * | 1/2005 | Dvorak et al. | 180/53.4 |

\* cited by examiner

*Primary Examiner*—Faye M. Fleming
(74) *Attorney, Agent, or Firm*—WRB-IP LLP

(57) ABSTRACT

A motor vehicle includes a chassis, a passenger compartment disposed on the chassis, a control center for remote, controllable equipment, the control center being disposed in the passenger compartment, and a dedicated interface for connecting the control center to the controllable equipment. A method for making a motor vehicle is also disclosed.

19 Claims, 3 Drawing Sheets

MOTOR VEHICLE INCLUDING CONNECTION FOR CONTROLLABLE EQUIPMENT AND METHOD OF MAKING A MOTOR VEHICLE

BACKGROUND AND SUMMARY

The present invention relates to motor vehicles and, more particularly, to motor vehicles including auxiliary controllable equipment.

In motor vehicles such as so-called "vocational" trucks, such as dump trucks, cement mixers, and refuse collection vehicles, it is common for an original equipment manufacturer (OEM) to deliver a basic truck platform for the vocational equipment. The basic truck platform typically comprises a chassis, an engine, and a cab, but does not include the specialized vocational equipment, such as the dumper, the cement mixer, or the trash receptacle. Ordinarily, the purchaser of the basic truck platform determines the end use to which the vehicle will be put.

The vocational equipment is typically not installed by the OEM but, rather, by the end user or, more typically, by an equipment installer that specializes in installing certain equipment on different type of truck platforms. To install the equipment, the equipment installer must tap into various electrical, pneumatic, or hydraulic circuits on basic truck and connect them to the equipment to be installed. The equipment is often powered by the motor of the vehicle.

The equipment installer is often not highly familiar with the circuits in the truck. The installation by the equipment installer is frequently sloppy in appearance, poor in quality and integrity, and, largely due to the installer's unfamiliarity with the truck circuits, the installation frequently damages the truck circuits.

OEMs estimate that a large percentage of repairs to equipment requested under the truck warranty are actually the result of poor installation of equipment. While these repairs are ordinarily not covered under the vehicle warranty, many OEMs perform them nonetheless to minimize damage to customer relations. These repairs are often costly and, even after the repair, the control installation, which the OEM has little to do with, often remains sloppy in appearance, and poor in quality and integrity. It is therefore desirable to provide an arrangement that can simplify the task of installing controllable equipment in connection with a vehicle. It is also desirable to improve the quality of equipment installations in connection with vehicles.

According to an aspect of the present invention, a motor vehicle comprises a chassis, a passenger compartment disposed on the chassis, a control center for remote, controllable equipment, the control center being disposed in the passenger compartment, and a dedicated interface for connecting the control center to the controllable equipment.

According to another aspect of the present invention, a method for making a motor vehicle including controllable equipment is provided. According to the method, in step a) a passenger compartment is assembled on a chassis including providing, in the passenger compartment, a control center for remote, controllable equipment and providing a dedicated interface for connecting the control center to the controllable equipment, and, subsequent to step a), controllable equipment is provided, remote from the control center, and the control center is connected to the controllable equipment via the dedicated interface.

In accordance with still another aspect of the present invention, a method for making a motor vehicle to be subsequently provided with controllable equipment is provided. According to the method, a passenger compartment is assembled on a chassis. In the passenger compartment, a control center is provided for controllable equipment to be located remote from the control center. A dedicated interface is provided for connecting the control center to the controllable equipment.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
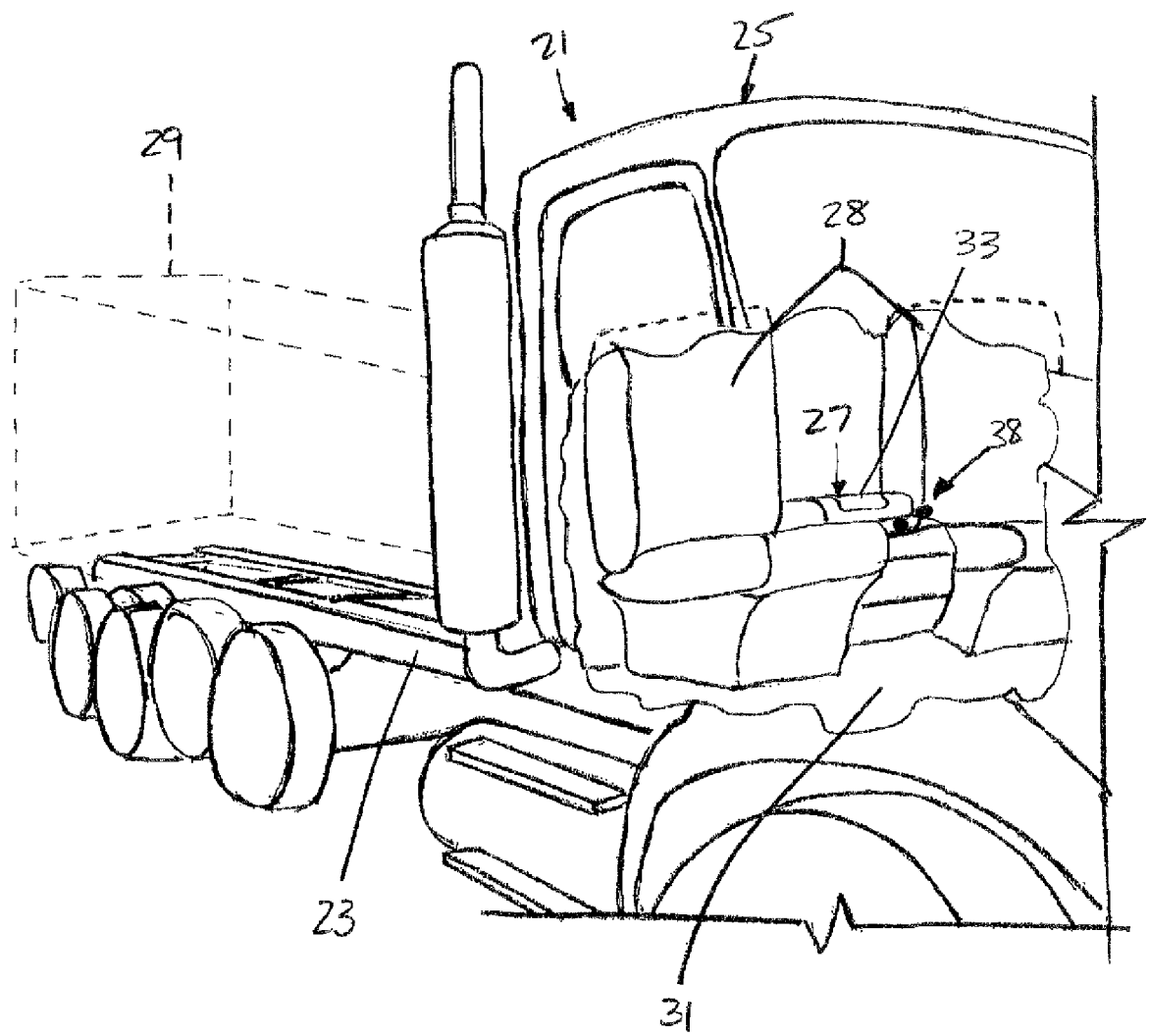
FIG. 1 is a perspective, partially broken view of a portion of a basic motor vehicle platform according to an embodiment of the present invention prior to attachment of controllable equipment.

A motor vehicle 21 according to an embodiment of the present invention is shown in FIG. 1. The motor vehicle 21 comprises a chassis 23 and a passenger compartment 25 disposed on the chassis. The motor vehicle can be any type of motor vehicle, from, for example, a passenger car or personal use class truck to the largest of long haul tractor trailers. However, it is presently believed that this invention will have particular applicability in connection with regional classes of trucks, such as are commonly used in construction, regional hauling, and refuse collection applications.

Figure 4:
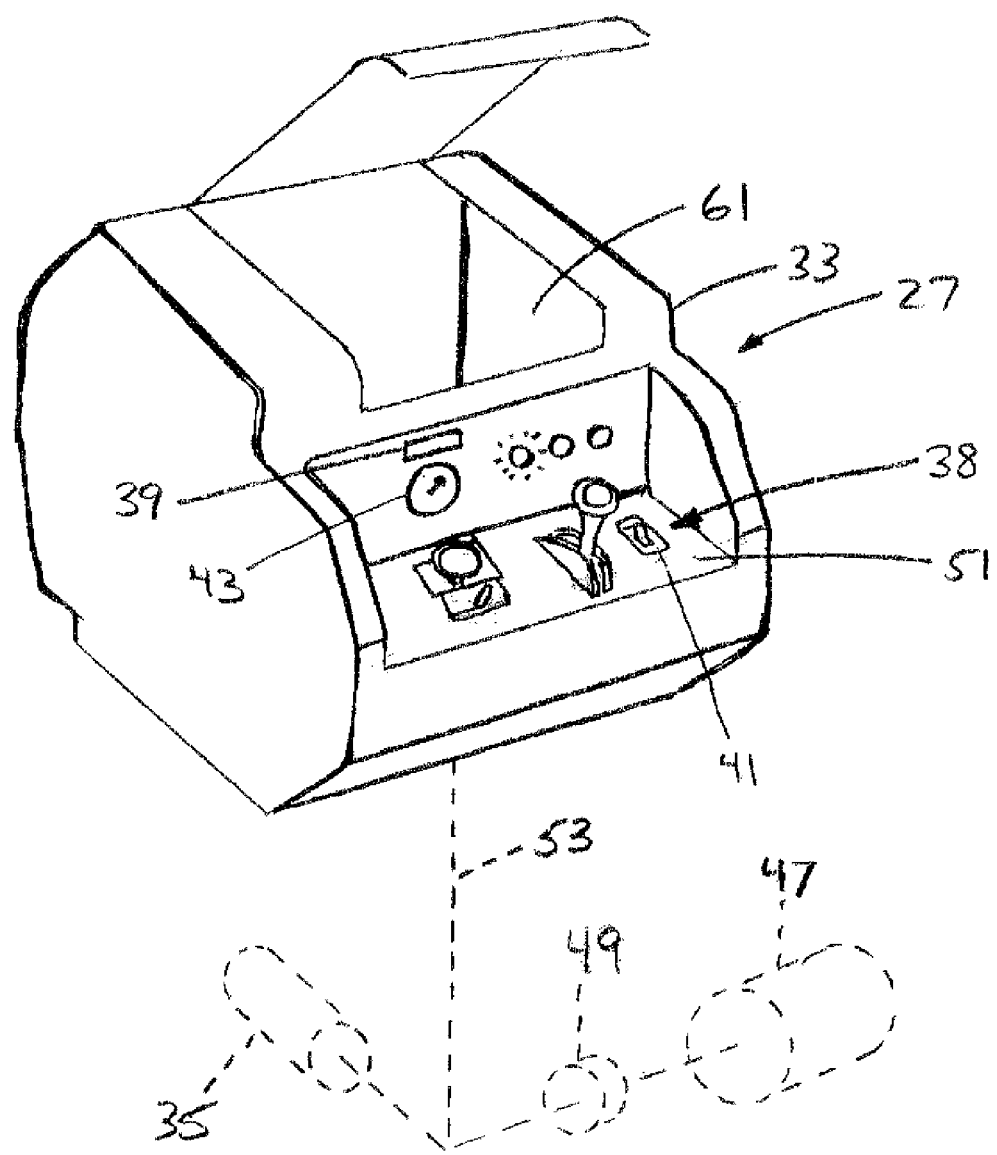
FIG. 4 is a perspective, partially schematic view of a control center connected to a dedicated interface and other components according to an embodiment of the present invention.

A control center 27 for controlling remote, controllable equipment 29 (a form of which is shown schematically and in phantom in FIG. 1) is disposed in the passenger compartment 25. The control center 27 will ordinarily be designed as an integral part of the interior 31 of the passenger compartment 25 in the sense that it will be manufactured and installed by the original equipment manufacturer (OEM) and can be in any suitable form, such as in the form of a console or cabinet 33. The console or cabinet 33 may be a free- or substantially free-standing item such as is depicted in FIGS. 1 and 4 but may be in any suitable form, such as forming part of a dashboard or other structure in the passenger compartment. By designing the control center 27 as an integral part of the interior 31 of the passenger compartment 25 to be manufactured and installed by the OEM, a standardized, high quality fit and finish can be provided for the control center, and the appearance and functionality of the interior can be optimized, such as by matching the control center 27 with seats 28 and other interior fixtures. In addition, as compared to prior art installations of control centers in vehicle passenger compartments such as truck cabs by equipment installers, delivery time to end users can be decreased because the installation will be the same or nearly the same for each vehicle.

Figure 2A:
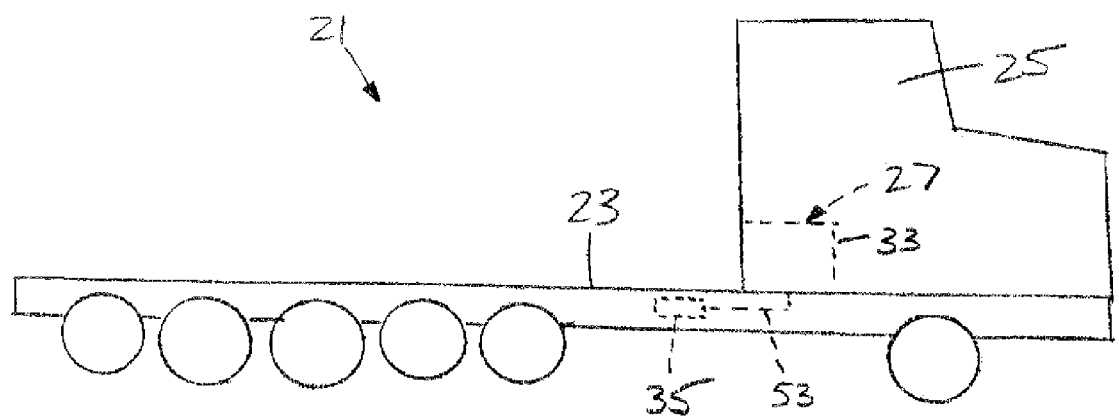
FIGS. 2A-2C are schematic views of a motor vehicle at different stages of an assembly process according to an embodiment of the present invention.
Figure 2B:
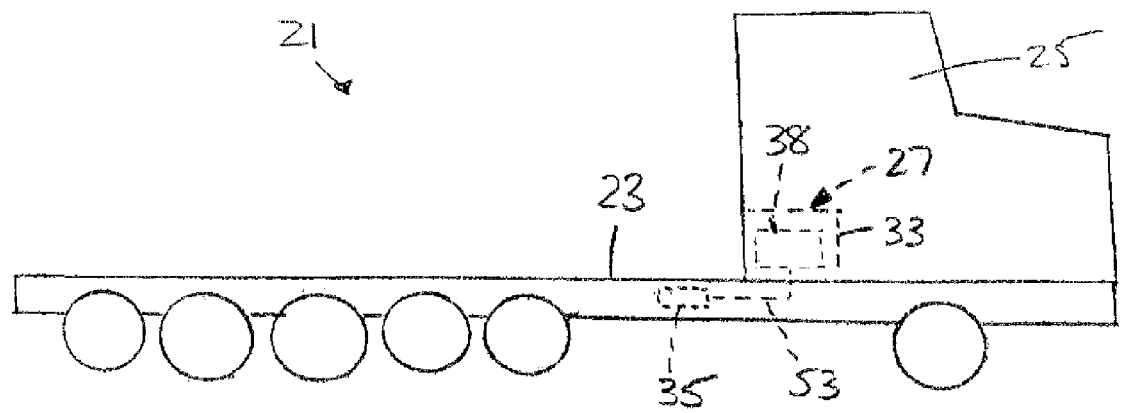
Figure 2C:
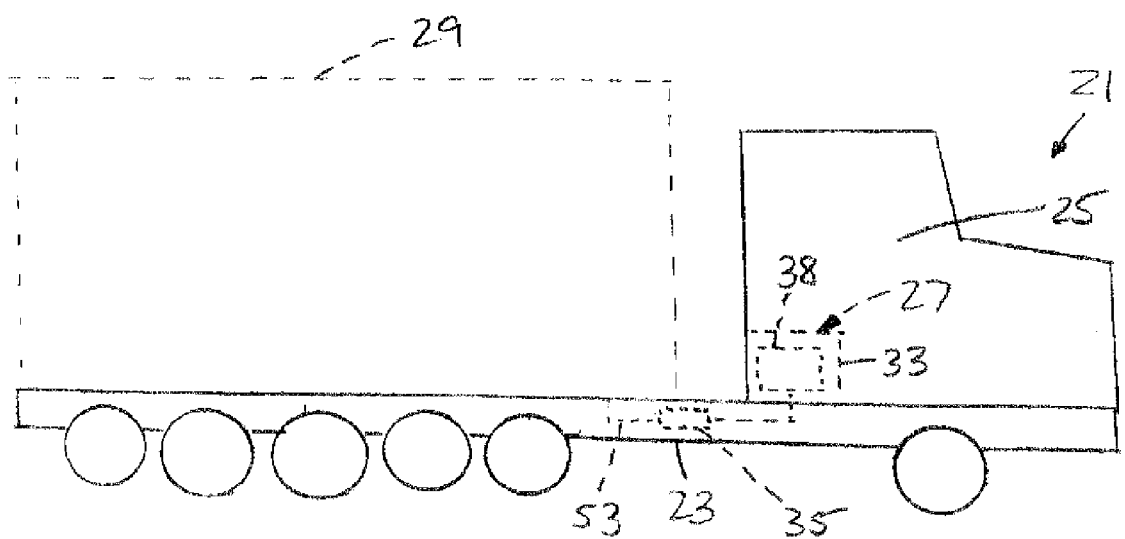

As seen in FIGS. 2A-2C, a dedicated interface 35 is provided for connecting the control center 27 to the controllable equipment 29. The dedicated interface 35 is ordinarily disposed outside of the passenger compartment 25.

Controllable equipment 29 in the sense used here comprises auxiliary equipment not forming an ordinary and necessary part of the vehicle. Although they are controlled, equipment such as directional lights and air brake systems (ABS) are not considered to be controllable equipment in the sense used here. The controllable equipment 29 in the sense used here comprises equipment such as controllable vocational equipment, such as cement mixers, dumping equipment, and refuse collection equipment, as well as equipment such as auxiliary axle structures.

In trucks of the type shown in FIGS. 1 and 2A-2C, controllable equipment 29, particularly vocational equipment such as cement mixers, dumping equipment, and refuse collection equipment, as well as equipment such as auxiliary axle structures, is mounted on the chassis 23. However, in other types of vehicles, controllable equipment may be mounted on a trailer or elsewhere, not necessarily on part of the motor vehicle. The present invention is also not intended to be limited to applications involving large trucks, and may be used in connection with any desired form of vehicle, such as personal use trucks such as pick-up trucks, passenger automobiles, and the like.

Figure 3:
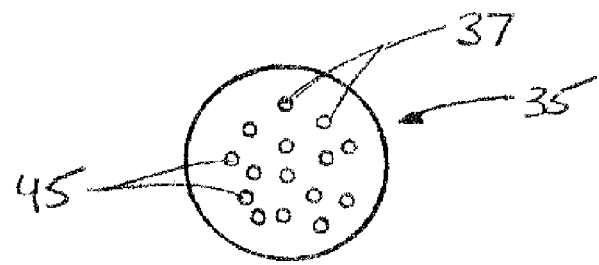
FIG. 3 is a schematic view of a dedicated interface including electrical terminals and pneumatic and/or hydraulic fittings according to an embodiment of the present invention.

As seen in FIG. 3, the dedicated interface 35 ordinarily includes at least one and ordinarily a plurality of terminals 37 for forming an electrical connection between the control center 27 and the controllable equipment 29. The electrical connections may be for any desired purpose, such as power transmission or data exchange. For example, a terminal can be arranged provide data on engine speed to an operator and/or to controllable equipment that is operated through a connection to the engine. Other terminals can be dedicated to other particular data and applications. As seen in FIG. 4, the control center 27 can include control assemblies 38 such as digital or analog meters 39, gauges, lights, etc. operable by electrical or other signals and associated with particular terminals 35 for, for example, monitoring controllable equipment 29 or other equipment on the motor vehicle 21. The control center 27 can include control assemblies 38 such as switches 41, dials 43, buttons, etc. for forming, breaking, or adjusting power provided at particular terminals 35 to control the controllable equipment 29.

The dedicated interface 35 is not limited to facilitating electrical connections and may instead or in addition include one or more fittings 45 for forming at least one of a pneumatic and a hydraulic connection associated with the controllable equipment. Pneumatic and/or hydraulic pressure can be controlled and monitored by control assemblies 38 such as switches 41, dials 43, etc., associated with the control center 27 that control and monitor devices such as pumps 47 and valves 49, and pressure vessels that can be operated to adjust pneumatic and/or hydraulic pressure. Equipment such as pumps 47, valves 49, pressure vessels and the like associated with pneumatic and/or hydraulic circuits may be disposed in any suitable location, such as on the chassis, so that pneumatic and/or hydraulic connections can be made directly at fittings 45 on the interface 35, or the interface may include electrical terminals 37 that permit monitoring and controlling the operation of the equipment such as the pumps, valves, and pressure vessels, with pneumatic and/or hydraulic connections being made remote from the interface.

The control center 27 ordinarily comprises a cabinet 33, and control assemblies 38 such as dials 41 and switches 43 are housed in the cabinet. Portions of the control assemblies 38 such as dial faces, switch levers, etc. are ordinarily mounted on an outer face 51 of the cabinet. Lines 53 such as electrical lines or other lines, such as pneumatic or hydraulic lines, ordinarily extend from the control assemblies to the dedicated interface 35. If, as is typical, the dedicated interface 35 is disposed outside of the passenger compartment 25, the lines 53 will ordinarily extend through a hole provided in a wall of the passenger compartment. A suitable structure such as a strain relief grommet will ordinarily be provided at the hole to prevent the lines 51 from inadvertently being pulled further into or out of the control center. The cabinet 33 can include a user-accessible storage space 61.

An aspect of the present invention involves providing the basic vehicle platform not including the controllable equipment. This is an operation that will ordinarily be entirely performed by an OEM, often prior to a decision as to what specific type of controllable equipment is to be installed, and generally prior to involvement of other entities such as an end user or an equipment installer that will install controllable equipment such as vocational equipment. According to this aspect of the invention as is described with reference to FIGS. 2A-2C, a method for making a motor vehicle 21 to be subsequently provided with controllable equipment 29 includes assembling a passenger compartment 25 on a chassis 23 (FIG. 2A). In the passenger compartment 25, a control center 27 is provided for the controllable equipment 29 that will be located remote from the control center. A dedicated interface 35 for connecting the control center 27 to the controllable equipment 29 is provided.

Ordinarily, subsequent to providing a control center 27, the controllable equipment 29 (FIG. 2C) is provided. The controllable equipment 29 ordinarily comprises at least one of a plurality of types of controllable equipment, such as a cement mixer, a dump truck bed and associated hydraulic or pneumatic connections, a refuse compaction arrangement, auxiliary wheels, and the like. The method comprise selecting at least one of the plurality of types of controllable equipment 29 to be provided and, as seen in FIG. 2B, providing control assemblies 38, such as meters 39, switches 41, dials 43, and the like, in the control center 27 appropriate for the at least one selected type of controllable equipment.

The steps of selecting at least one of the plurality of types of controllable equipment 29 to be provided and providing controls in the control center 27 appropriate for the at least one selected type of controllable equipment can be performed during the operations of assembling the passenger compartment 25 on the chassis 23, providing the control center 27, and providing the dedicated interface 35 for connecting the control center to the controllable equipment 29. For example, if, prior to or during assembly of the vehicle 21, it is determined what the application of the vehicle will be, the controls can be provided at some point in the course of the assembly of the passenger compartment 25 on the chassis, the provision of the control center 27, and the provision of the dedicated interface 35. Of course, the assembly of the passenger compartment 25 on the chassis, the provision of the control center 27, and the provision of the dedicated interface 35 may all be performed before the decision is made as to the type of application for the vehicle, in which case, the appropriate controls can be installed at a later time. Also, the decision as to the type of application for the vehicle may be made at any time, including before assembly of the vehicle, yet the appropriate controls for that application may not be provided until during or after the assembly of the passenger compartment 25 on the chassis, the provision of the control center 27, and the provision of the dedicated interface 35.

The controllable equipment 29 is ordinarily provided remote from the control center 27, such as on a part of the chassis 23 remote from the passenger compartment 25 or cab. The control center 27 is then connected to the controllable equipment 29 via the dedicated interface 35. The connections formed at the dedicated interface 35 may be any of electrical, pneumatic, or hydraulic connections, or other connections such as might be appropriate for controlling equipment.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A motor vehicle, comprising:
    a chassis;
    a cab disposed on the chassis;
    a control center for remote, controllable equipment, the control center being disposed in the cab; and
    a dedicated interface outside the control center and physically connected to the control center via a first physical connection, the dedicated interface defining a connection point for forming a second physical connection between the control center and the controllable equipment, wherein the first and second physical connections are both respective ones of a wired electrical connection, a hydraulic connection, and a pneumatic connection.

2. The motor vehicle as set forth in claim 1, wherein the dedicated interface is disposed outside of the cab.

3. The motor vehicle as set forth in claim 1, comprising controllable equipment.

4. The motor vehicle as set forth in claim 3, wherein the controllable equipment is mounted on the chassis.

5. The motor vehicle as set forth in claim 1, wherein the controllable equipment comprises controllable vocational equipment.

6. The motor vehicle as set forth in claim 1, wherein the controllable equipment comprises auxiliary axle structures.

7. The motor vehicle as set forth in claim 1, wherein the dedicated interface includes at least one terminal for forming an electrical connection between the control center and the controllable equipment.

8. The motor vehicle as set forth in claim 7, wherein the dedicated interface includes at least one fitting for forming at least one of a pneumatic and a hydraulic connection associated with the controllable equipment.

9. The motor vehicle as set forth in claim 1, wherein the dedicated interface includes a plurality of terminals for forming at least one electrical connection between the control center and the controllable equipment.

10. The motor vehicle as set forth in claim 9, wherein the dedicated interface includes at least one fitting for forming at least one of a pneumatic and a hydraulic connection associated with the controllable equipment.

11. The motor vehicle as set forth in claim 1, wherein the dedicated interface includes at least one fitting for forming at least one of a pneumatic and a hydraulic connection associated with the controllable equipment.

12. The motor vehicle as set forth in claim 1, wherein the control center comprises at least one control assembly.

13. The motor vehicle as set forth in claim 12, wherein the control center comprises a cabinet, the at least one control assembly being housed in the cabinet.

14. The motor vehicle as set forth in claim 13, wherein the cabinet includes a user-accessible storage space.

15. The motor vehicle as set forth in claim 1, wherein the dedicated interface permits control of the controllable equipment from the control center through the dedicated interface.

16. The motor vehicle as set forth in claim 1, wherein the second physical connection is one of
    a wired electrical connection between an electrical control on the control center and remote, controllable, electrical equipment,
    a hydraulic connection between a hydraulic control on the control center and remote, controllable, hydraulic equipment, and
    a pneumatic connection between a pneumatic control on the control center and remote, controllable, pneumatic equipment.

17. A vocational truck, comprising:
    a chassis configured to support a vocational body having at least one controllable equipment component;
    a cab supported on the chassis;
    a control center disposed in the cab and including a control member for controlling the at least one controllable component; and
    a dedicated interface connected to the control center via a first physical connection and mounted on the truck, the interface including at least one device for forming a second physical connection between the control center to the controllable component, wherein the first and the second physical connections are both respective ones of a wired electrical connection, a hydraulic connection, and a pneumatic connection.

18. The vocational truck as set forth in claim 17, wherein the dedicated interface permits control of the controllable equipment from the control center through the dedicated interface.

19. The vocational truck as set forth in claim 17, wherein the second physical connection is one of
    a wired electrical connection between an electrical control on the control center and remote, controllable, electrical equipment,
    a hydraulic connection between a hydraulic control on the control center and remote, controllable, hydraulic equipment, and
    a pneumatic connection between a pneumatic control on the control center and remote, controllable, pneumatic equipment.

* * * * *